United States Patent
Arbuckle

(10) Patent No.: US 11,608,912 B2
(45) Date of Patent: Mar. 21, 2023

(54) FIXING APPARATUS AND METHOD

(71) Applicant: Linian Supply Co. Limited, Glasgow (GB)

(72) Inventor: Wesley Arbuckle, Glasgow (GB)

(73) Assignee: Linian Supply Co. Limited, Glasgow (GB)

( * ) Notice: Subject to any disclaimer, the term of this patent is extended or adjusted under 35 U.S.C. 154(b) by 233 days.

(21) Appl. No.: 16/640,716

(22) PCT Filed: Aug. 28, 2018

(86) PCT No.: PCT/GB2018/052422
§ 371 (c)(1),
(2) Date: Feb. 20, 2020

(87) PCT Pub. No.: WO2019/043367
PCT Pub. Date: Mar. 7, 2019

(65) Prior Publication Data
US 2021/0372541 A1    Dec. 2, 2021

(30) Foreign Application Priority Data

Aug. 28, 2017 (GB) ...................... 1713754

(51) Int. Cl.
*F16B 13/04* (2006.01)
*F16L 3/04* (2006.01)
(Continued)

(52) U.S. Cl.
CPC ................ *F16L 3/04* (2013.01); *F16B 2/243* (2013.01); *F16B 13/045* (2013.01); *F16L 3/127* (2013.01); *H02G 3/32* (2013.01)

(58) Field of Classification Search
CPC ........ F16B 13/04; F16B 13/045; F16B 2/243; F16B 5/0685; F16L 3/04; F16L 3/00; F16L 3/127; F16L 3/237; H02G 3/32
(Continued)

(56) References Cited

U.S. PATENT DOCUMENTS 1,531,916 A  *  3/1925  Flintjer ................... F16B 13/08
                                                      182/228.1
2,563,240 A  *  8/1951  Heath ..................... F16B 2/241
                                                      24/458

(Continued)

FOREIGN PATENT DOCUMENTS

EP          0105865 A2    4/1984
EP          0433621 A2    6/1991
(Continued)

OTHER PUBLICATIONS

International Search Report, PCT/GB2018/052422, EPO (dated Dec. 6, 2018).
(Continued)

*Primary Examiner* — Nkeisha Smith
(74) *Attorney, Agent, or Firm* — Wright IP & International Law; Eric G. Wright

(57) ABSTRACT

Disclosed is a fixing (1) for securing an article (21) to a surface (19). The fixing comprising a coupling arrangement (3) for coupling the fixing to an article such as cabling. Elongate members (5) extend from the coupling arrangement and are moved together to insert the fixing into a cavity (17), and spring apart to retain the fixing in the cavity. The elongate members have resiliently deformable inner formations (9). The inner formations engage with one another and resiliently deform when the elongate members are brought together, thereby increasing the pull resistance of the fixing. The inner formations are inwardly extending branches each presenting a ramped surface oriented towards the distal ends (Continued)

(8) of the respective elongate member, assisting in coupling an article to the fixing.

21 Claims, 9 Drawing Sheets

(51) Int. Cl.
*F16B 2/24* (2006.01)
*F16L 3/127* (2006.01)
*H02G 3/32* (2006.01)

(58) Field of Classification Search
USPC .......................................... 248/71, 74.3, 49
See application file for complete search history.

(56) References Cited

U.S. PATENT DOCUMENTS

| | | | |
|---|---|---|---|
| 3,633,250 A | | 1/1972 | Romney |
| 3,737,128 A | | 6/1973 | Schuplin |
| 4,260,122 A | | 4/1981 | Fiala |
| 4,294,156 A | * | 10/1981 | McSherry ............... F16B 37/04 411/908 |
| 5,845,883 A | | 12/1998 | Meyer |
| 5,906,346 A | * | 5/1999 | Lin ........................ F16B 5/02 248/225.11 |
| 6,161,804 A | * | 12/2000 | Paske ...................... F16L 3/12 248/74.1 |
| 6,276,644 B1 | | 8/2001 | Jennings et al. |
| 6,296,430 B1 | | 10/2001 | Fischer |
| 6,742,760 B2 | | 6/2004 | Blickhan et al. |
| 6,896,461 B2 | | 5/2005 | Fleydervish et al. |
| 8,496,420 B2 | * | 7/2013 | Aoki ..................... F16B 21/075 411/553 |
| 9,488,208 B2 | | 11/2016 | Hemingway et al. |
| 10,047,775 B2 | | 8/2018 | Bruckbauer et al. |
| 10,894,516 B2 | * | 1/2021 | Benedetti ............. F16B 5/0657 |
| 2002/0066833 A1 | | 6/2002 | Ferrill et al. |
| 2003/0021655 A1 | | 1/2003 | Correll et al. |
| 2005/0069398 A1 | * | 3/2005 | Arbuckle ............... F16B 2/248 411/34 |
| 2014/0017025 A1 | | 1/2014 | Hemingway et al. |
| 2015/0101150 A1 | * | 4/2015 | Harvey ................. B65D 88/36 24/129 B |
| 2015/0330560 A1 | | 11/2015 | Zhang |
| 2016/0281881 A1 | * | 9/2016 | Vaccaro ................... F16B 1/00 |
| 2018/0163899 A1 | * | 6/2018 | Rajpal .................. F16L 3/2235 |

FOREIGN PATENT DOCUMENTS

| | | |
|---|---|---|
| WO | 2017149271 A1 | 9/2017 |
| WO | 2019043367 A1 | 3/2019 |

OTHER PUBLICATIONS

International Search Report, PCT/GB2017/050407, EPO (dated Apr. 28, 2017).

* cited by examiner

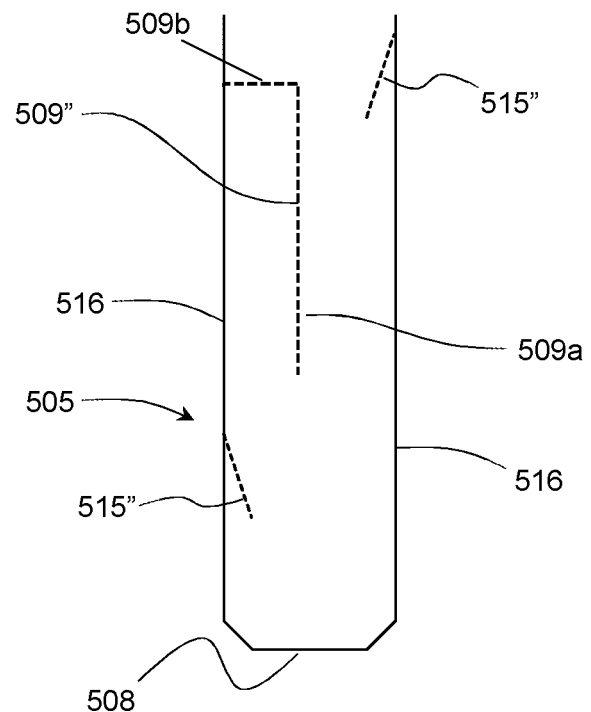
Figure 2C
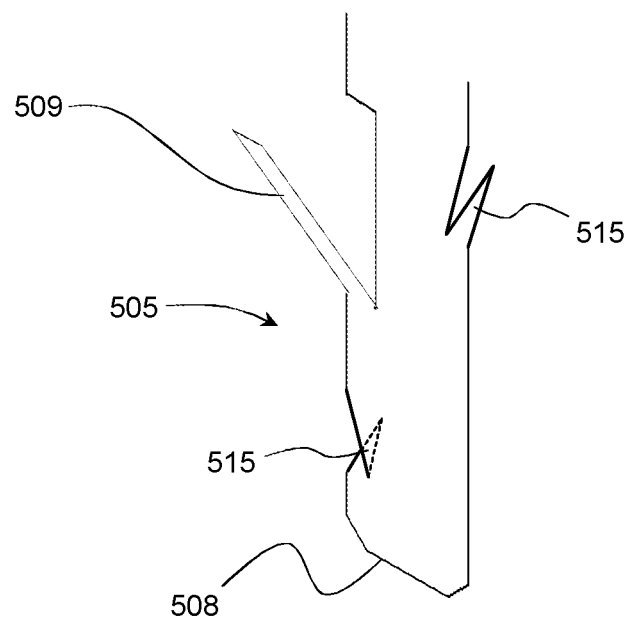

FIXING APPARATUS AND METHOD

CROSS-REFERENCE TO RELATED APPLICATIONS

This application is a US National Stage Entry of PCT/GB2018/052422 titled "Fixing Apparatus And Method" filed Aug. 28, 2018, which claims benefit of foreign priority to GB 1713754.8 filed Aug. 28, 2017, and titled "Fixing Apparatus And Method". This application claims the benefit of foreign priority to GB 1713754.8 filed Aug. 28, 2017, through PCT/GB2018/052422 filed Aug. 28, 2018.

INCORPORATION BY REFERENCE

This US National Stage Entry incorporates by reference in its entirety copending PCT Application No. PCT/GB2018/052422 titled "Fixing Apparatus And Method" filed Aug. 28, 2018, which incorporates by reference in its entirety GB 1713754.8 filed Aug. 28, 2017, and which is titled "Fixing Apparatus And Method". GB 1713754.8 filed Aug. 28, 2017, is incorporated by reference herein in its entirety.

FIELD OF THE INVENTION

The present invention relates to apparatus and methods for securing articles to a surface, such as a wall of a building, and in particular the invention relates to securing cabling, pipework and the like.

BACKGROUND TO THE INVENTION

In order to attach articles to a wall or other surface, for example of a building, it is known to use a fixing such as a bracket or saddle clip. Conventionally, such fixings are installed by drilling a suitably sized hole, inserting a deformable plug (such as a rawl plug or butterfly plug) and passing a screw though an aperture in the fixing and into the deformable plug. The screw causes the plug to deform or expand, applying pressure against the walls of the hole, thereby retaining the fixing in place.

Use of fixings of this general type can however be time consuming. Each fixing can take at least around 30-60 seconds to install and this can be problematic when a large number of fixings are required. For example, when a long run of cabling or pipework or the like is to be secured to a wall, hundreds or in some cases thousands of fixings are required and the cumulative time to install them can significantly contribute to the overall time for an installation.

One approach to address this issue has been the use of fixings or clips which require neither a screw nor a plug to install. A clip can be used having opposed resiliently biased legs. The legs can be squeezed together to introduce the clip into a hole, and when released spring outwardly and into engagement with the walls of the hole. Barbs on the outside of the legs may provide additional engagement with the wall and increase the force required to remove the clip from the hole. One such device, for fixing cables, is the Linian Fire Clip™ of Linian Supply Co. Limited, Glasgow, United Kingdom.

Whilst devices such as the Linian Fire Clip provide a substantial time saving for fixing long runs of cabling, their utility is limited by the forces required to remove them (typically around 100-110 N). There remains a need for fixings which may be installed with similar efficiency, and which are capable of securing still greater loads and/or which can be used in wider diameter holes.

SUMMARY OF THE INVENTION

According to a first aspect of the invention there is provided a fixing for securing an article to a surface;
the fixing comprising a coupling arrangement, for coupling the fixing to a said article; and
two elongate members extending from the coupling arrangement;
  the elongate members being resiliently biased towards a position in which they are spaced apart from one another along at least a part of their length;
  each elongate member comprising a resiliently deformable inner formation, the inner formations extending toward an adjacent elongate member and positioned to engage therewith and resiliently deform, when the elongate members are brought together in use.

Each elongate member may comprise a resiliently deformable inner formation spaced apart from a proximal end and a distal end of the elongate member.

A coupling arrangement may be configured to couple the fixing to an article by introducing the article between the elongate members towards the coupling arrangement. Each said inner formation is preferably in the form of a branch or an arm that extends inwardly from the respective elongate member. Each said inner formation advantageously presents a ramped surface oriented towards the distal ends of the respective elongate member.

Each elongate member may comprise an inner formation extending inwardly from and proximally from the distal end of the elongate member.

An article in use encounters and rides up the ramped surfaces, forcing the inner formations and/or elongate members apart. Thus, the article does not "snag" against the inner formations.

The elongate members may be brought together (typically manually squeezed together) and inserted into a cavity, such as a cylindrical hole as formed by a drill or the like. The elongate members are resiliently biased apart so as to into engage with the cavity walls and retain the fixing in position. The relative size of the cavity to the elongate members may be selected so that the inner formations are also resiliently deformed on insertion of the elongate members, and thereby supplement the outward forces applied to the cavity walls. Moreover, the inner formations are positioned so that the outward forces they apply are distributed along the elongate members both proximally and distally of the inner formations. Accordingly, the provision of inner formations on the elongate members increases the "pull out resistance" of the fixing (i.e. the force required to remove it from the cavity).

The elongate members may be biased towards a position in which they diverge from one another away from their proximal ends. The elongate members may be biased towards a position in which they diverge from one another away from their distal ends.

The elongate members may be generally bowed, and biased towards a position in which their proximal and distal ends converge.

The elongate members may be joined at their proximal and/or distal ends.

The elongate members may be biased towards a position in which they are spaced apart along all, or the majority of their length.

When we refer to any part of the fixing, such as the elongate members, being biased towards a positon, we refer to the position adopted in the absence of any forces or physical constraints applied to relevant part of the fixing.

The inner formation of a first elongate member may be positioned to engage with the inner formation of a second elongate member, when the elongate members are brought together.

An inner formation may extend from an inside of an elongate member.

An inner formation may comprise a resilient member extending from an inside of an elongate member.

For example, an inner formation may comprise an arm extending from an inside of an elongate member. An inner formation may be a branch from an inside of an elongate member.

Advantageously, an inner formation, e.g. an arm or branch, may extend inwardly from the respective elongate member away from the distal end of the respective elongate member.

Accordingly, the inner formations extending from the two elongate members are further apart towards the distal ends of the elongate members.

This arrangement of particular benefit when an article is fixed to the coupling arrangement by introducing the article between the elongate members (e.g. when the coupling arrangement is a loop between the elongate members), since the inner formations present a "ramped" surface to the introduced article and the inner formations and/or elongate members can be readily deflected to allow the article to pass between them to the coupling arrangement. The arms may thereafter also assist in retaining the article.

An arm or branch may extend inwardly from the respective elongate member towards the distal end of the elongate member.

In some embodiments, the inner formations are otherwise configured to present a ramped surface oriented towards the distal ends of the elongate members. For example, a branch or arm extending inwardly towards the distal end of the elongate member may be curved or angled towards the distal end of the inner formation, so as to provide said ramped surface. An elongate member may be branched; one or more branches thereof functioning as an inner formation.

An inner formation may be formed from a portion of a length of an elongate member.

For example, at least a part of an outline of an inner formation may be a cut-out from an elongate member and bent inwardly therefrom. An end and one side of an inner formation may be cut out from a side of an elongate member. An end and two sides of an inner formation may be cut out from a face of an elongate member.

By "cut-out" we include any suitable method, such as by pressing or stamping, e.g. from a strip of material, or cutting e.g. laser or mechanical cutting.

An inner formation may be formed as a kink, bend or corrugation along an elongate member. An inner formation formed as a kink, bend or corrugation may present a ramped surface towards the distal ends of the elongate member An elongate member may be resilient.

Thus, an inner formation formed from a portion of a length of an elongate member may function as a resiliently deformable inner formation.

An inner formation may comprise a deformable region, comprising for example an elastomeric or resilient plastics material. The elongate members may comprise a sleeve comprising one or more resiliently deformable materials, such as elastomers and the like. An elastomeric material may be glued or mechanically fixed to an inside of an elongate member.

An elongate member may comprise two, or more than two, inner formations (which may be the same or of more than one type). Two or more inner formations may be spaced apart along a length of an elongate member.

For example, a fixing may comprise a branch or arm extending from one elongate member, and a kink or corrugation extending from another elongate member. Indeed a given elongate member may comprise both an inwardly extending branch or arm and a kink/bend/corrugation, or two more branches.

Terms such as inside, inner, or inward refer to a surface(s), formation or region of an elongate member having an orientation or extending in a direction generally towards another elongate member. Conversely, terms such as outside or outer, refer to a direction or orientation of an elongate member generally away from other elongate member(s).

The elongate members may comprise distal portions free of inner formations. In use, once the inner formations have engaged with adjacent elongate members, or adjacent inner formations, the distal portions or the elongate members may be brought closer together, in some embodiments without significant deformation of the inner formations.

This arrangement facilitates insertion of the distal portions into a cavity. Moreover, the application of a force generally along the elongate members (i.e. the insertion direction) may be translated into resilient deformation of the inner formations.

A distal portion of an elongate member may be inwardly curved or kinked. The distal portion may transition smoothly to the portion of the elongate member proximal thereto.

When brought together, the distal portions may form a wedge, so assist in guiding the elongate members into a cavity. For example, outer surface of at least the distal portions may be smooth.

An elongate member may comprise one or more barbs or projections extending outwardly. Such barbs or projects may assist in engaging with a cavity wall, in use.

The one or more barbs/projections are preferably oriented away from the distal end of the elongate member so as to engage most strongly with a cavity wall when a force is applied to pull the fixing from the cavity. For example, the one or more barbs/projections may be ramped away from the distal end of the elongate member. The one or more barbs/projections may be resilient.

At least a part of an outline of each barb may be a cut-out from an elongate member and bent outwardly therefrom.

The relative position of inner formations and barbs along an elongate member may be selected so that the outward forces applied by the inner formations in use are effectively transferred to the barbs.

An inner formation may be positioned adjacent to a barb, along an elongate member. An inner formation may be positioned between barbs, along an elongate member. An elongate member may comprise barbs proximal and distal to an inner formation.

At least a portion of an outer surface of an elongate member may be conformable, for example to an inner surface of a cavity. For example, an elongate member may comprise an outer conformable region along all or a part of its length. A conformable region may be plastically deformable or flowable, or elastically deformable. In use, the outer conformable region may conform to an inside of a cavity, and convey additional pull resistance.

Also disclosed is a fixing for securing an article to a surface;

the fixing comprising a coupling arrangement, for coupling the fixing to a said article; and two elongate members extending from the coupling arrangement;

the elongate members being resiliently biased towards a position in which they are spaced apart from one another along at least a part of their length;

each elongate member comprising an outer conformable region along all or a part of its length.

Each elongate member may have a proximal end adjacent to the coupling arrangement and a distal end, and comprise a resiliently deformable inner formation spaced apart from the proximal and distal ends, the inner formations extending toward an adjacent elongate member and positioned to engage therewith and resiliently deform, when the elongate members are brought together in use.

An outer conformable region may be formed from a plastics material. An outer conformable region may be formed from an elastomeric material.

An outer conformable region may be affixed to an elongate member by any suitable method. For example, an elongate member may comprise a sleeve (such as a plastics or elastomeric sleeve). A conformable region, such as a block of a deformable material, may be adhesively or mechanically attached to an outer surface of an elongate member.

An elongate member may comprise a keying formation, such as a ridged or corrugated surface, to improve bonding to an outer conformable region. A keying formation, for example comprising ridges across (rather than along a length of) an outside of an elongate member may also resist slippage between a conformable region and the elongate member when a fixing is urged into or out of a cavity, in use.

The fixing may comprise more than two elongate members. The fixing may comprise one or more pairs of opposed elongate members. The fixing may comprise three or more elongate members diverging from the coupling arrangement, operable to be brought together in use.

Typically, each elongate member is the same however the invention is not limited to a fixing having two or more identical elongate members.

The coupling arrangement may comprise a loop or hook or T-Bar or screw-type head (for back box fixing). The coupling arrangement may be adapted to receive a screw or a bolt therethrough. For example, the coupling arrangement may be formed generally as a disc or plate having an aperture therethrough. In some embodiments, in use a screw or bolt may be threaded through the coupling arrangement and between the elongate members. In some embodiments, the screw or bolt may pass between the inner formations, which may still further increase the force urging the elongate members apart. This arrangement may for example be used to screw a box, such as an electrical junction box, to a wall or the like.

The coupling arrangement, in particular a loop, may extend from a proximal end of a first elongate member to a proximal end of a second elongate member. The elongate members and the coupling arrangement may be formed from a single strip of material.

An article may in use be coupled to the coupling arrangement by passing it between the elongate members so as to be received by the coupling arrangement.

At least a part of the coupling arrangement may be resilient, and so contribute to the biasing of the elongate members. For example, the fixing may comprise a resilient hook or loop or T-Bar head or screw-type head.

The invention is not limited to any particular type of coupling. For example, the fixing may be adapted to secure cables, piping or the like (e.g. the hook or loop described above) or may be a releasable coupling such as a bracket. The coupling may comprise a male and female cooperating formations, removably securable to one another, the removable portion of which is securable to an article; so as to facilitate temporary removal of the article from the fixing.

The fixing may be a clip, such as a cable clip. The clip, and the coupling arrangement in particular, may be sized to clip a cable, conduit, duct, pipe or the like to a surface (e.g. a wall). The clip or its coupling arrangement may be sized or configured to clip a more than one such article together and to a surface.

The elongate members may be sized to be inserted into a hole, typically a round hole, as made for example by a drill bit.

The fixing may be of unitary construction (i.e. formed from a single piece of material).

The fixing may comprise or be substantially formed from a resilient material, such as steel. Other metals or alloys may also be used, such as titanium, a nickel alloy (e.g. Eligoy® or nitinol).

At least a part of the fixing may be provided with an external coating, such as a plastics coating, paint, lacquer, an anodized coating, or any other suitable protective coating. The coating may be of a particular colour (for example for consistency with cables which are colour coded for safety reasons). In some embodiments, at least the coupling arrangement is provided with an insulating barrier coating, such as a plastics, paint or lacquer. An insulating barrier coating may resist galvanic corrosion between the fixing and an item (e.g. a pipe) coupled to the coupling arrangement.

In alternative embodiments, the fixing may be used in conjunction with an insulating barrier member such as a bush, which can be fixed to the coupling arrangement or article to be secured thereto, to separate the article and the coupling arrangement.

In a second aspect, the invention extends to a method of making a fixing, the method comprising; providing, a strip of resilient material, such as spring steel;

forming a coupling arrangement from a central portion of the strip;

forming elongate members from end portions of the strip, the elongate members extending from the coupling arrangement and resiliently biased to be spaced apart from one another along at least a portion of their lengths;

forming a resiliently deformable inner formation from at least a part of a length of each elongate member; optionally, each inner formation being spaced apart from a proximal end and a distal end of the elongate member;

the inner formations extending toward an adjacent elongate member and positioned to engage therewith and resiliently deform, when the elongate members are brought together in use.

The method may comprise cutting a strip of length of material to size, for example from a roll or a sheet of material.

The coupling arrangement may be formed by bending the strip into a loop or T-piece. The loop may be sized to receive one or more cables.

The strip may be bent in a first direction to form a coupling arrangement and in a second direction such that the end portions of the strip form elongate members resiliently biased towards a position in which they are spaced apart from one another along at least a part of their length. The elongate members may be biased towards a position in which they extend away from one another towards their distal ends.

The method may comprise forming the inner formations by bending the elongate members into a kink, bend or corrugation, as disclosed herein.

The method may comprise cutting out at least a part of an outline of an inner formation from each elongate member, and bending the inner formation inwardly from the elongate member so as to form an inwardly extending branch or arm.

The method may comprise bending an end of the inner formations.

The method may comprise bending the inner formations to form a ramp facing the distal ends of the elongate formations. The method may comprise bending the inner formation so that the ends of opposed inner formations are generally aligned (so as to aid their engagement with one another in use).

The method may comprise cutting an outline of an end and one side of an inner formation, from a side of an elongate member.

The outline of the side(s) of the inner formation may extend along the elongate member from the outline of the end of the inner formation, towards the distal end of the elongate member. Accordingly, when the inner formation is bent inwardly, it diverges from the elongate member away from the distal end of the elongate member.

The steps of cutting out at least a part of an outline or an inner formation, and bending the inner formation may be performed in a single step, for example using a stamp or pressing apparatus.

In some embodiments, the inner formations of the elongate members may differ. For example one elongate member may be bent to form a kinked, corrugated or bent inner formation(s), whereas the other may comprise an inner formation that has been formed as a cut out. Most conveniently, however, the elongate members are the same as one another.

The method may comprise forming one or more barbs in an analogous manner, by cutting out at least a part of an outline of a barb from an elongate member, and bending the one or more barbs outwardly. The one or more barbs may be cut from an edge or a face of the strip of material.

The method may comprise anodizing the strip/fixing.

The various steps may be conducted in any suitable sequence. For example, the central section of the strip may be bent to form the coupling arrangement, and then the inner formations cut out/bent (or stamped in a single cutting out and bending step), or vice versa.

Indeed the coupling arrangement may be formed before the strip of material is provided; for example by bending or forming a sheet of material and then cutting the so formed sheet of material into strips.

At least a part of the fixing may be provided with an external coating, such as a plastics coating, paint, lacquer, an anodized coating, or any other suitable protective coating. The coating may be of a particular colour (for example for consistency with cables which are colour coded for safety reasons).

In a third aspect of the invention there is provided a method of fixing an article to a surface, comprising;
providing a cavity in a surface (for example by drilling a hole);
providing a fixing having (at least) two elongate members extending from a coupling arrangement; the elongate members being resiliently biased towards a position in which they are spaced apart from one another along at least a part of their length; and the elongate members each comprising a resiliently deformable inner formation in the form of an inwardly extending branch or arm, being optionally spaced apart from a proximal end and a distal end of the elongate member; the inner formations extending toward an adjacent elongate member;
coupling an article to the fixing by introducing the article between the elongate members towards the coupling arrangement; thereby causing the article to ride up ramped surfaces of the inner formations oriented towards the distal ends of the elongate members;
bringing the elongate members closer together and inserting the elongate members into the cavity;
resiliently deforming an inner formation which is spaced apart from a proximal end and a distal end of the elongate member, and thereby applying an outward force to the elongate members; and/or causing an outer conformable region to conform to inner surfaces of the cavity under the action of outward forces applied to or by the elongate members.

The article may be coupled to the coupling arrangement before or after insertion of the elongate members into the cavity.

The method may comprise plastically or elastically deforming the or each outer conformable region.

The method may comprise bending branches or arms extending inwardly from one or both elongate members. The arms/branches may be bent by introducing an article, such as a cable, between the elongate members and into the coupling arrangement (e.g. a loop).

The article may ride along a ramped surface of an inner formation or the ramped surfaces of opposed inner formations and thereby deflect the inner formations and/or the elongate members apart.

Coupling an article to the fixing may comprise providing an insulating barrier member between the article and the coupling. For example, a bushing may be attached to (e.g. within) the coupling arrangement, or attached to (e.g. around) the article.

The method may comprise providing a fixing in accordance with other aspects of the invention.

The surface may be a wall, such as the wall of a building. The wall may be an internal or an external wall. The wall may be a concrete or stone wall. It will be understood that the invention is not limited to such applications, and the fixing may be configured for use with any type of wall material such as plasterboard, wood, brick, breeze block or the like.

It is also to be understood that preferred or optional features described in relation to any aspect of the invention may be present in combination with preferred or optional features described in relation to any other aspect of the invention.

DESCRIPTION OF THE DRAWINGS

Non-limiting example embodiments will now be described with reference to the following drawings in which.

FIG. 2C is a view of a face of an elongate member of the fixing of FIG. 2A;

FIG. 2D is a perspective view of the elongate member of FIG. 2C;

DETAILED DESCRIPTION OF EXAMPLE EMBODIMENTS

Figure 1A:
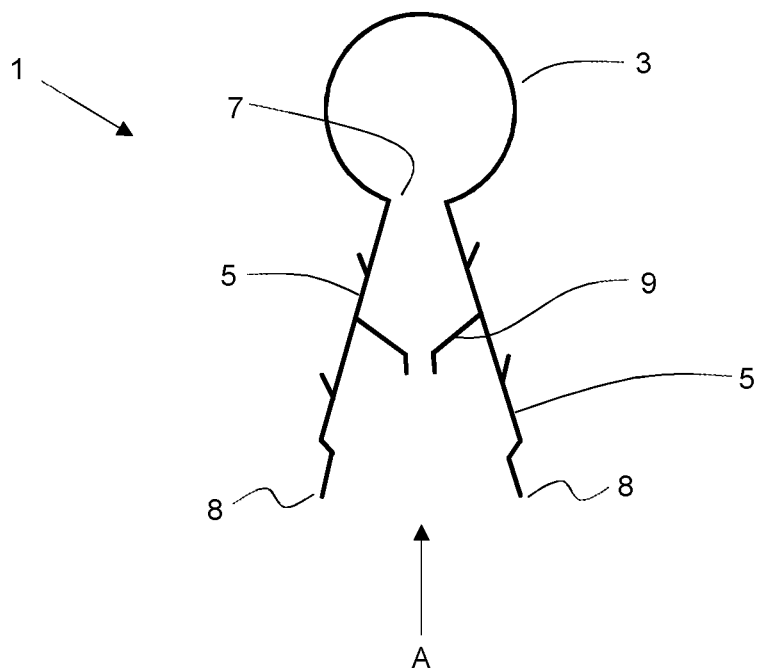
FIG. 1A shows a side view of a fixing.

FIG. 1A shows a side view of a fixing 1 (in the embodiment shown, a cable clip) for securing an article to a surface. The fixing has a coupling arrangement 3 and elongate members, legs 5, extending therefrom.

The coupling arrangement is formed as a loop 3 extending between the legs 5. The loop is sized to receive one or more cables, conduits, pipes or the like, which may passed between the legs 5 and into the loop 3 to be coupled to the fixing 1 (generally in the direction A).

The fixing 1 is shown "at rest", i.e. in the configuration adopted in the absence of any externally applied forces or constraints. The elongate members 5 have proximal ends 7, adjacent to the coupling arrangement 3 and extend to distal ends 8. The elongate members 5 are resiliently biased towards the position shown in FIG. 1, in which they diverge from one another away from their proximal ends 7.

An inner formation 9 extends or branches inwardly of each leg 5. The inner formations 9 are spaced apart from the proximal and distal ends 7, 8.

The inner formations, in this case arms 9, are themselves resiliently deformable. Accordingly, when the legs 5 are squeezed together in use (as described in further detail below), the arms 9 contact one another and are deflected towards alignment with the legs.

Figure 1B:
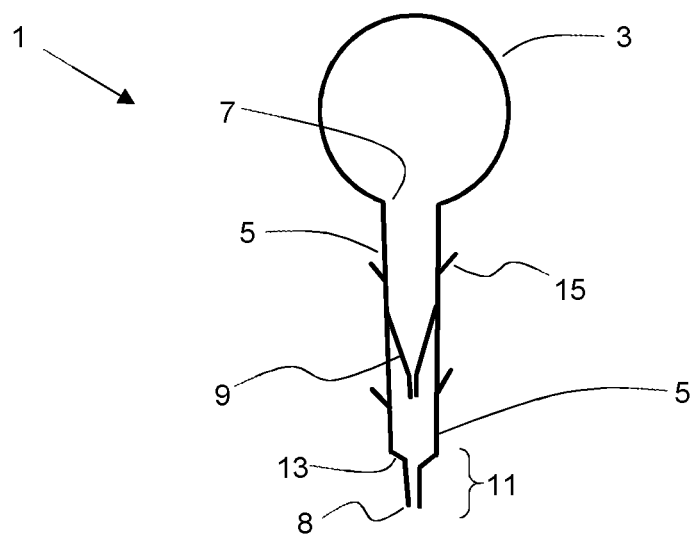
FIG. 1B shows a side view of the fixing of FIG. 1A, with elongate members held together.

FIG. 1B shows the configuration of the fixing 1 when the legs 5 are squeezed together in this way. The resilient deformation of the arms 9 contributes to the biasing force urging the legs 5 apart. The relatively central position of the arms 9 ensures that the outward biasing forces applied by the arms is distributed along the legs 5 both proximally and distally of the arms 9.

In the embodiment shown, the arms 9 engage with one another and are resiliently deformed. In other embodiments (not shown) the arms may be staggered, so as to engage with the adjacent leg when the legs are squeezed together.

The distal portions 11 of the legs 5 are inwardly kinked, and transition to the regions proximal thereto via a ramp 13. Thus, when the legs 5 are brought together, the distal fixing is narrowest at it distal ends 7 and the distal regions 11 present an outwardly tapering wedge shape, to assist in insertion into a cavity (as described in further detail below). Additionally, the inner formations, arms 9, are spaced apart from the distal regions along the legs 5, and so do not impede bringing the distal ends together.

The legs 5 are also provided with outwardly extending barbs 15. The barbs 15 are ramped away from the distal ends 7 and so add relatively little resistance to insertion of the legs 5 into a cavity, but act to catch against imperfections in a cavity wall and/or bite into a cavity wall, and resist removal of the fixing 1, as described below. The barbs 15 are positioned both proximally and distally of the arms 9, so that the outward forces applied by the arms in use are effectively transmitted to the barbs.

Figure 2A:
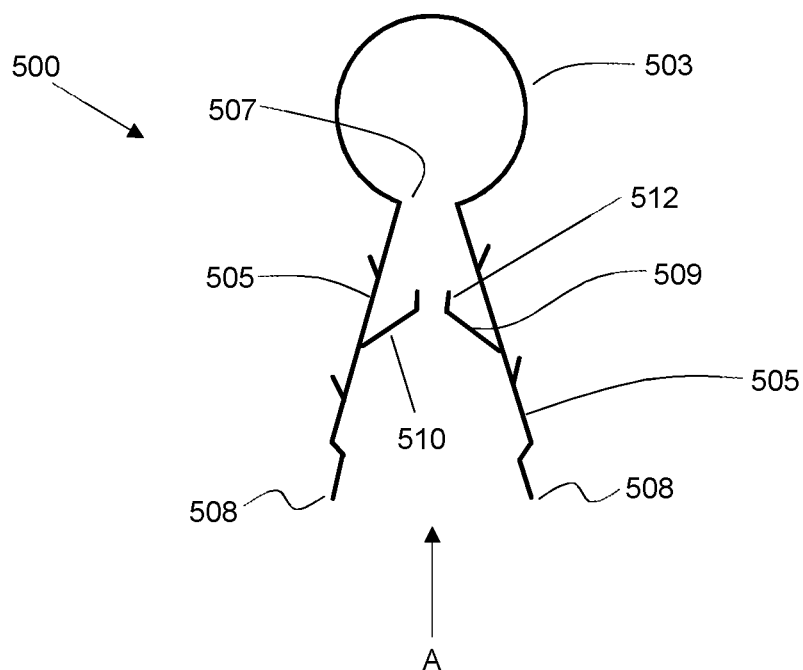
FIG. 2A shows a side view of an alternative embodiment of a fixing.

FIG. 2A shows a side view of a fixing 500 for securing an article to a surface. Features in common with the fixing 1 are provided with like reference numerals, incremented by 500.

The fixing 500 has a coupling arrangement 503 and elongate members, legs 505, extending therefrom. The coupling arrangement is formed as a loop extending between the legs 505. The loop is sized to receive one or more cables, conduits, pipes or the like, which may passed between the legs 505 and into the loop 503 to be coupled to the fixing 500 (generally in the direction A).

The legs 505 of the fixing 500 comprise inner formations, in this case arms 509. The arms are themselves resiliently deformable, and are formed from cut out portions of a length of each of the legs, as described below. Accordingly, when the legs 505 are squeezed together in use (as described in further detail below), the arms 509 contact one another and are deflected towards alignment with the legs.

Unlike the arms 9 of the fixing 1, the arms 509 extend towards one another, away from the distal ends 508 of the legs 505. Accordingly, they present ramped surfaces 510 oriented towards the distal ends 508. In use, when a cable is introduced in the direction a, it encounters and rides up the ramped surfaces 510, forcing the arms 509 apart. Thus, the cable does not "snag" against the arms and, moreover, when they spring back behind the cable they assist in retaining it in the loop 503. This can be of particular benefit for embodiments in which the loop is sized to receive more than one cable.

Figure 2B:
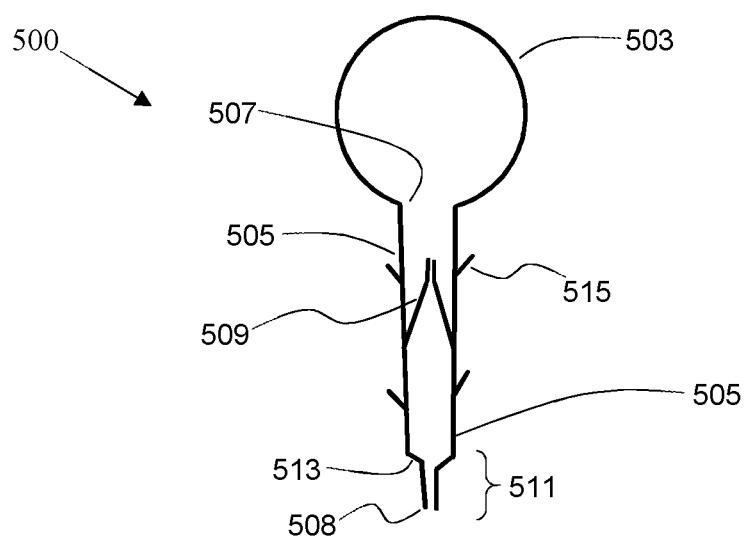
FIG. 2B shows a side view of the fixing of FIG. 2A, with elongate members held together.

FIG. 2B shows the configuration of the fixing 500 when the legs 505 are squeezed together, for example for insertion into a hole or when inserted in a hole. The resilient deformation of the arms 509 contributes to the biasing force urging the legs 505 apart, as discussed above in relation to FIG. 1.

In the embodiment shown, the arms 509 are provided with an addition bent end portions 512 that are relatively parallel with one another when the fixing 500 is at rest. This assists the arms 509 engaging smoothly with one another the legs are squeezed together.

The further features of the fixing 500 are as described above for the fixing 1, including the inwardly kinked distal portions 511, ramp 513 and outwardly extending barbs 515.

The fixing 500 is formed from a strip of material, by bending and forming the strip of material in a suitable manner known in the art. In particular, the arms 509 and the barbs 515 are cut and bent away from the elongate members 505, typically by an automated press or stamp.

Figure 2E:
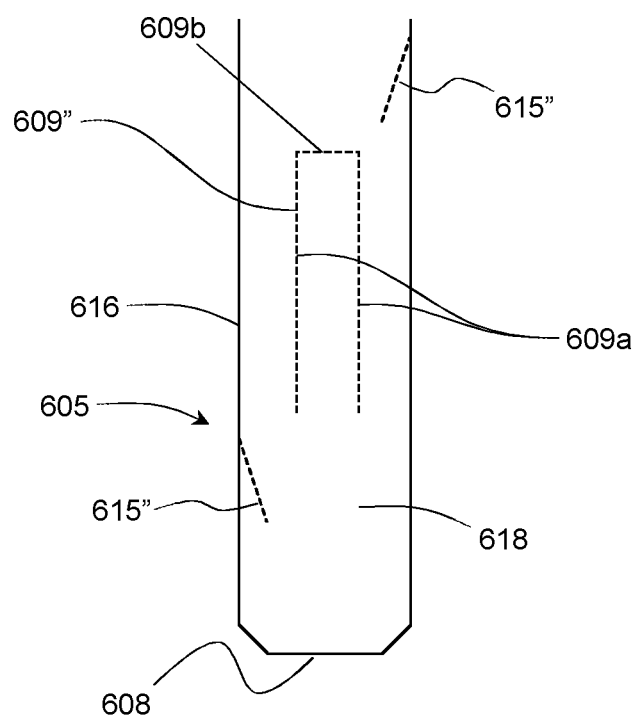
FIG. 2E is view of a face of an alternative embodiment of an elongate member.

FIG. 2C shows a view of the face of a leg 505. The dotted lines show the outlines of the barbs (dotted lines 515") and arms (dotted lines 509"). In the embodiment shown, the arms 509 and barbs 515 are each cut out from an edge 516 of the legs 505. In alternative embodiments, as shown in FIG. 2E (reference numerals incremented by a further 100), the arms 609 can be cut out from a face 618 of the legs 605.

The outline of the side 509a of the inner formation 509 extends along the elongate member from the outline of the end 509b of the inner formation, away from the distal end of the elongate member. Accordingly, when the inner formation is bent inwardly as shown in FIG. 2D, it diverges from the elongate member away from the distal end 508 of the elongate member.

FIG. 2D shows the elongate member 505 with the arm 509 having been bent inward, and the barbs 515 having been bent outward (typically stamped from a strip of material forming the fixing 500, in a single step).

Figure 3A:
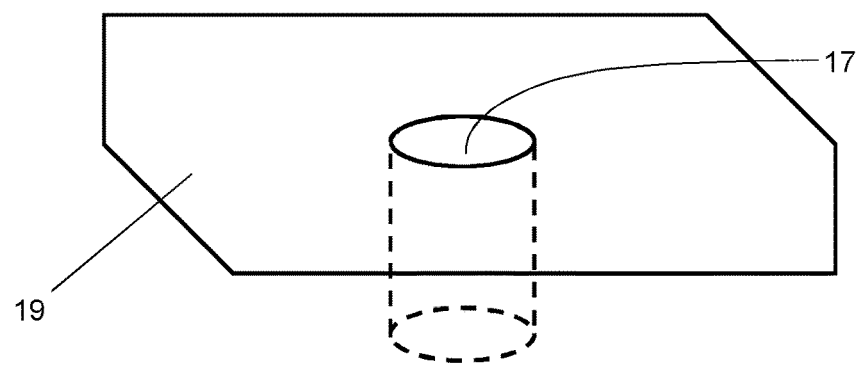
FIGS. 3(a)-3(d) show the steps of securing an article to a surface.
Figure 3B:
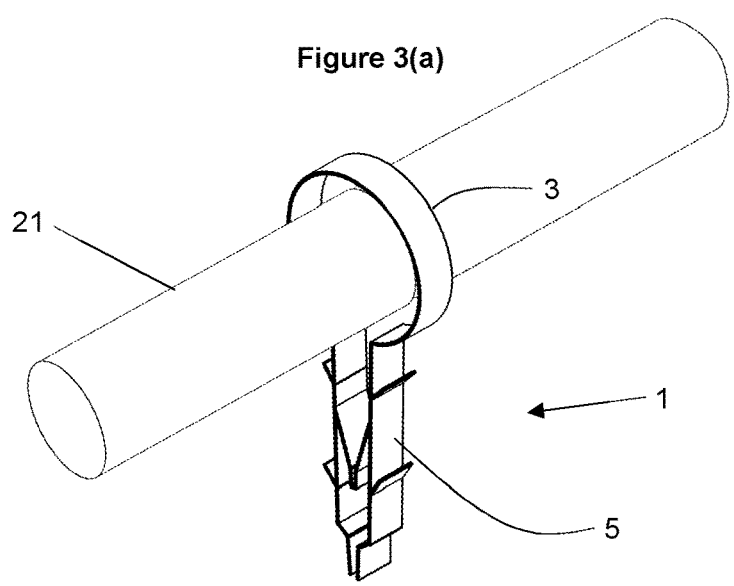

Use of the fixing 1 will now be described with reference to FIGS. 3(a)-(d). FIG. 3(a) shows a hole 17 having been drilled in a surface 19 (e.g. a building wall). FIG. 3(b) shows a perspective view of the fixing 1 with a wire 21 been coupled to the coupling arrangement (loop 3), by insertion between the elongate members 5 in the direction A as described above with reference to FIG. 1. The fixing 1 is shown with the legs 5 squeezed together (as would typically be done between finger and thumb).

Figure 3C:
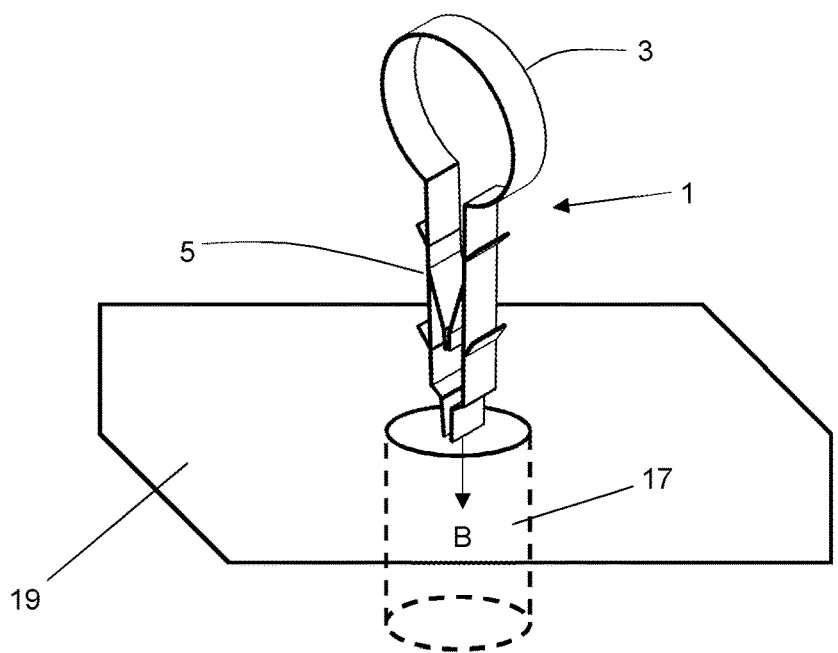
Figure 3D:
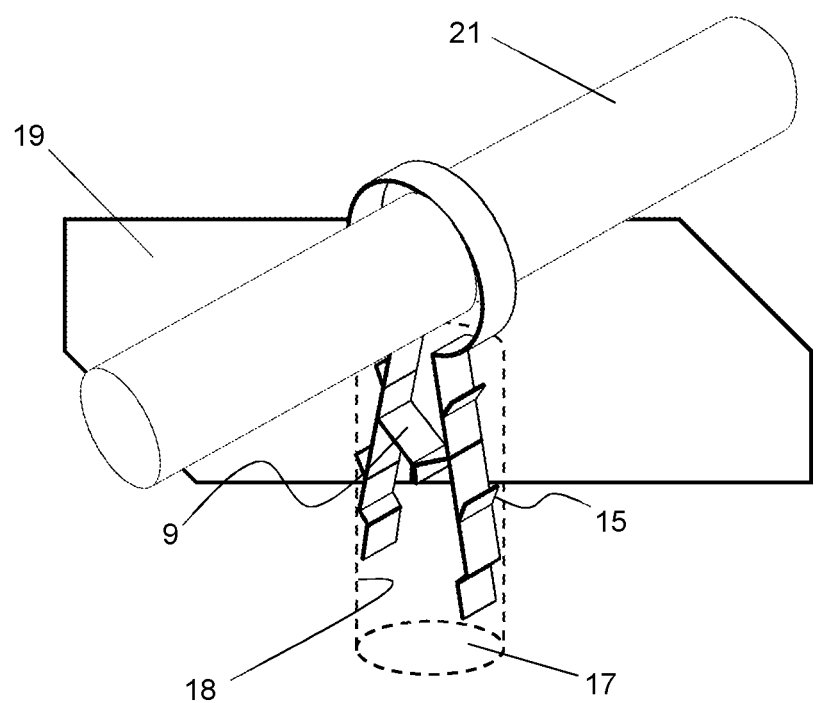

The legs 5 are then inserted into the hole 17 (direction B, FIG. 3(c), in which the wire 21 is omitted for clarity.) As shown in FIG. 3(d), once the pressure holding the legs 5 together has been released, they spring apart and into engagement with the inside walls 18 of the hole 17. During insertion, the lip of the hole 17 and/or the walls 18 may slide against the ramp 13, the smooth transitional surface provided by the ramp thereby facilitating insertion of the fixing into the hole.

There is insufficient space in the hole 17 for either the legs 5, or the resilient inner arms 9 to return to their "at rest" positions as shown in FIG. 1. Accordingly, the arms 9 provide additional outward force of the legs 5 against the walls 18 of the hole 17.

Figure 4:
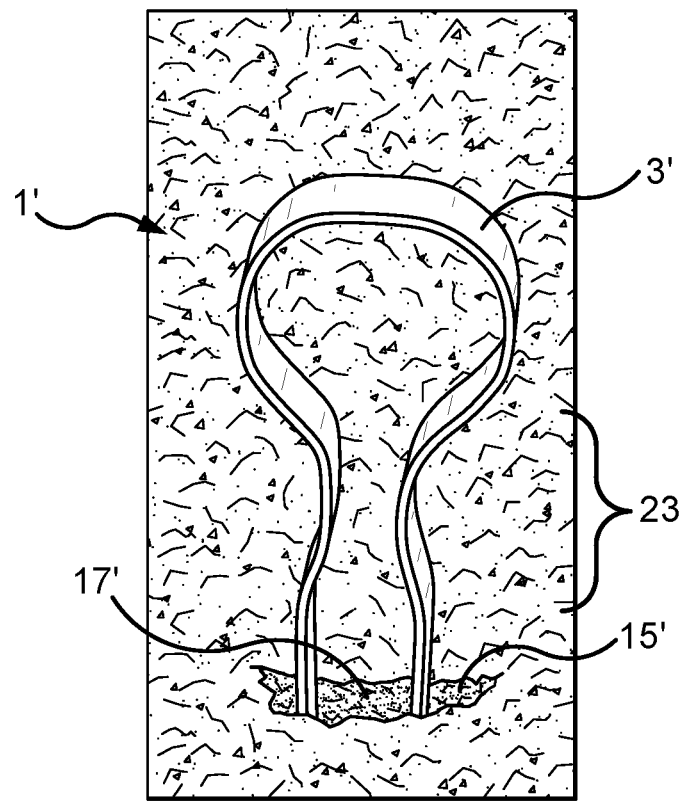
FIG. 4 shows a perspective view of another embodiment of a fixing, positioned in a hole in a concrete surface.

In practice, the inner walls of a drilled hole in typical building material such as concrete, brick, plaster board and the like will be uneven; as depicted in the perspective view of FIG. 4, showing a fixing 1' in a hole drilled in concrete. The rough inner surfaces provide a footing against which barbs 15' can grip.

As also visible in FIG. 4, the legs 5' (or indeed any elongate member) may optionally be curved, in this instance at a proximal region 23 to the coupling arrangement 3', so as to increase the length of the elongate members 5 in contact with the walls of the cavity 17' in which the fixing is placed.

Figure 5:
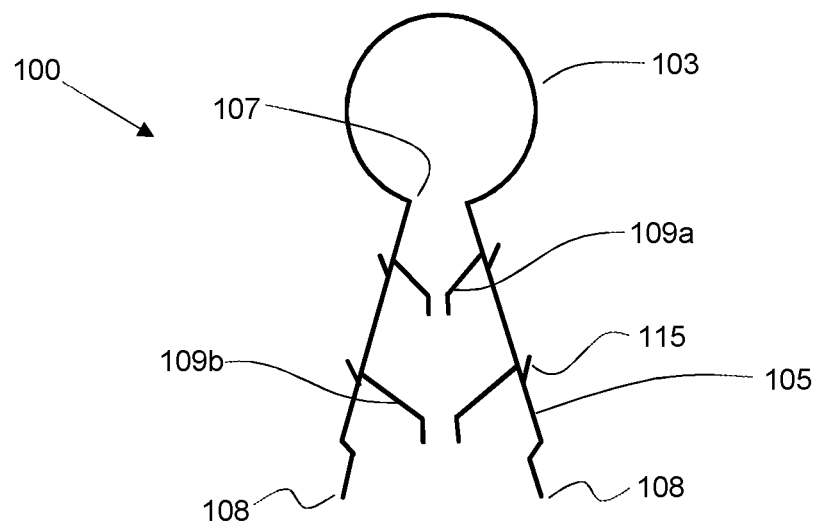
FIG. 5 shows a side view of a further embodiment of a fixing.

An alternative embodiment of a fixing 100 is shown in FIG. 5. Features of fixing 100 in common with fixing 1 are provided with like reference numerals, incremented by 100. The legs 105 of fixing 100 each have two inner formations, arms 109a and 109b. The inner formations are spaced apart from the proximal and distal ends 107, 108 of the legs 105.

In the embodiment shown, the fixing 100 has barbs adjacent to each of the arms 109a, 109b, such that that the outward biasing forces applied by the arms are transmitted to the corresponding adjacent barbs.

Figure 6:
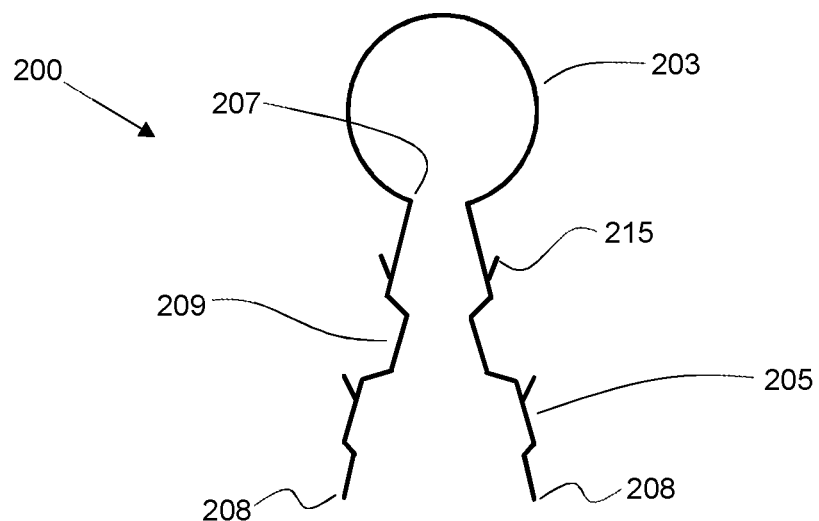
FIG. 6 shows a side view of a still further embodiment of a fixing.

Another embodiment of a fixing 200 is shown in FIG. 6. Features of fixing 200 in common with fixing 1 are provided with like reference numerals, incremented by 200. The legs 205 of the fixing 201 have an inner formation in the form of an inwardly kinked portion 209. By virtue of the resilience of the legs 205 (and thus the inner formations 209), when the legs are brought together, the inner formations may be resiliently deformed and thus act to urge the legs apart, in the manner described above.

Optionally, the barbs may be formed by cuts in the material of the legs, bent away from the outer face as shown. Thus, the entire clip may be formed from a single strip of a resilient material, such as spring steel.

Figure 7:
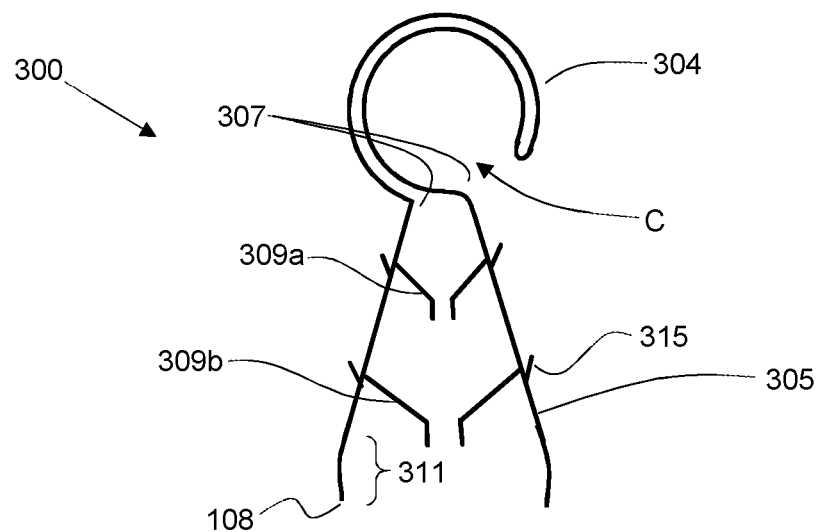
FIG. 7 shows a side view of yet another embodiment of a fixing.

A still further embodiment of a fixing 300 is shown in FIG. 7. Features in common with the fixing 100 are provided with like numerals, incremented by 200. The fixing 300 is provided with a coupling arrangement in the form of a hook 304. An article such as cable, pipework or a frame can be coupled to the fixing by insertion generally in the direction C. The hook is formed from the same strip of resilient steel as the legs 305, and can be bent open so as to admit or remove the article. This arrangement enables an article to be inserted and removed from the coupling arrangement independently of securing the fixing arrangement to a surface.

The distal portions of the legs 305 of the fixing 300 are inwardly curved towards their distal ends 307. When the legs are brought together, the distal portions together form a generally wedged shape, to assist in inserting the fixing into a cavity.

Figure 8:
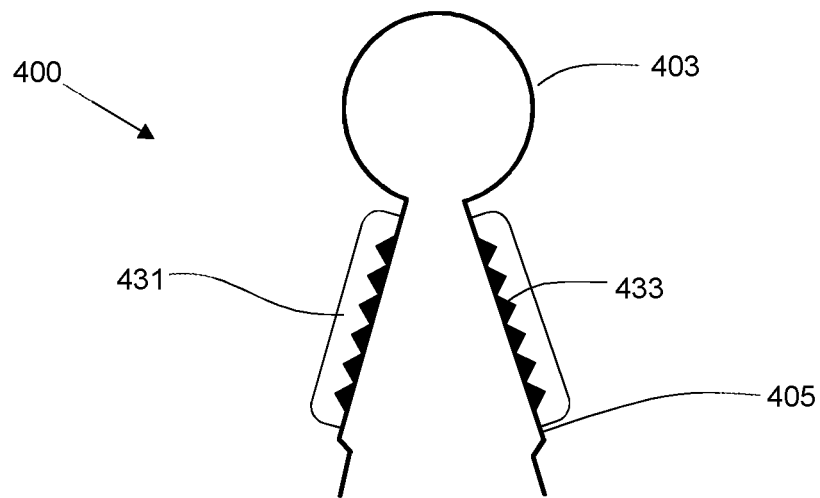
FIG. 8 shows a side view of another embodiment of a fixing.

Yet another embodiment of a fixing 400 is shown in FIG. 8. Features of the fixing 400 in common with the fixing 1 are provided with like reference numerals, incremented by 400. The elongate members, legs 405, are provided with outer conformable regions 431, glued to the outer surfaces of the legs. The outer conformable regions are in the form of elastomeric blocks. In other embodiments, alternative plastics materials may be used. For example, conformable regions formed from PTFE or any other suitable plastics material may be capable of plastically deforming in use, so as to conform to the inner surface of a hole.

The legs also have ribbed outer surfaces 433, so as to increase the surface area of contact to the outer conformable regions. The ribs run perpendicular to the legs (i.e. into and out of the page, from the side view of FIG. 8), and so help to resist slippage between the elastomeric blocks 431 and the legs 405 when forces are applied along the legs, in use.

In use of the fixing 400, when the legs 405 are resiliently biased apart towards the walls of a hold or other cavity, the elastomeric blocks conform to the inner surface of the cavity and so contribute to the pull resistance of the fixing.

In alternative embodiments (not shown) the fixing may be provided both with resiliently conformable inner formations and deformable outer regions.

Figure 9:
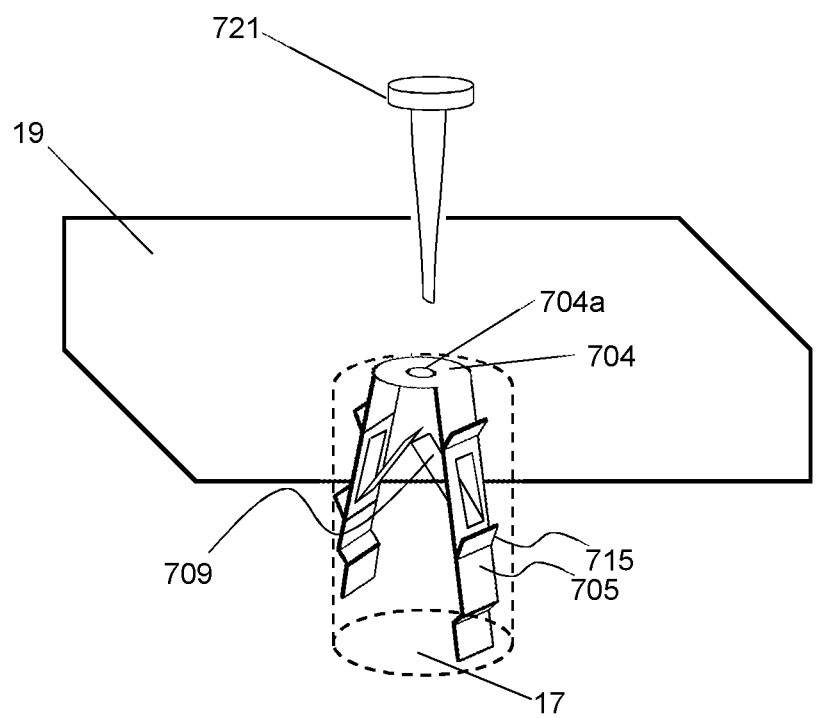
FIG. 9 is a perspective view of another embodiment of a fixing.

Another fixing 700 is shown in FIG. 9, in a hole 17 of a surface 19. The fixing 700 has legs 705 having inner formations (arms) 709 formed by a stamp, and extending inwardly from the legs 705. The legs are attached to a coupling arrangement 704, in the form of a disc, having an aperture 704a therethrough. The arms and legs function a described above to retain the fixing in the hole.

The aperture is sized to threadably receive a screw 721 therethrough, such that the screw can pass between the legs 705 and the arms 709. The arms, and thus also the legs are then urged further apart by the screw 721, increasing the force of the legs and barbs 715 against the inside walls of the hole 17.

The fixing can be used to screw an article such as an electrical junction box, to the surface.

Figure 10:
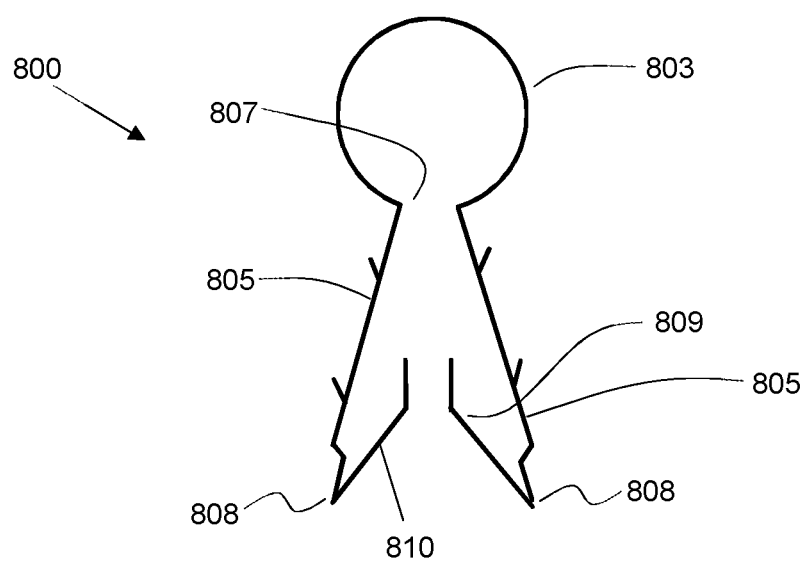
FIG. 10 is a side view of another embodiment of a fixing.

Anther fixing 800 is shown in FIG. 10. Features in common with the embodiment of FIG. 2A are provided with like reference numerals, incremented by 300. Each elongate member 805 has an inner formation 809, 801 extending inwardly from and proximally from the distal end 808 of the elongate member.

The invention claimed is:

1. A fixing for securing an article to a surface, comprising:
   a coupling arrangement;
   a first elongate member extending from the coupling arrangement and having a first proximal end and a first distal end;

a second elongate member extending from the coupling arrangement and having a second proximal end and a second distal end, the first elongate member and second elongate member each being resiliently biased towards a position in which they are spaced apart from one another along at least a portion of a length of said first elongate member and a portion of a length of said second elongate member, the fixing having a resting state and a use state;

said first elongate member having a first resiliently deformable inner formation in the form of a branch or an arm that extends inwardly from the first elongate member toward said second elongate member, said second elongate member having a second resiliently deformable inner formation in the form of a branch or an arm that extends inwardly from the second elongate member toward said first elongate member, the first resiliently deformable inner formation of said first elongate member positioned to engage with a portion of said second elongate member and resiliently deform upon engagement with said portion of said second elongate member, the second resiliently deformable inner formation of said second elongate member positioned to engage with a portion of said first elongate member and resiliently deform upon engagement with said portion of said first elongate member, the first resiliently deformable inner formation and the second resiliently deformable inner formation configured to apply an outward force to each of said first elongate member and said second elongate member when the elongate members are engaged in the use state, wherein the first resiliently deformable inner formation of said first elongate member presents a first ramped surface oriented towards the first distal end, and wherein the second resiliently deformable inner formation of said second elongate member presents a second ramped surface oriented towards the second distal end.

2. A fixing according to claim 1, wherein the first resiliently deformable inner formation is spaced apart from the first proximal end and the first distal end, and wherein the second resiliently deformable inner formation is spaced apart from the second proximal end and the second distal end.

3. A fixing according to claim 1, wherein the first elongate member is biased towards a position diverging away from the second proximal end; and wherein the second elongate member is biased towards a position diverging away from the first proximal end.

4. A fixing according to claim 1, wherein the first inner formation extends inwardly away from the first distal end, and wherein the second inner formation extends inwardly away from the second distal end.

5. A fixing according to claim 1, wherein at least a part of an outline of an inner formation is a cut-out from one of said first elongate member and said second elongate member and the inner formation is bent inwardly therefrom.

6. A fixing according to claim 1, wherein the first distal portion is free of an inner formation and the second distal portion is free of an inner formation.

7. A fixing according to claim 1, wherein the first distal portion has an inwardly curved portion or an inwardly kinked portion, and wherein the second distal portion has an inwardly curved portion or an inwardly kinked portion.

8. A fixing according to claim 1, wherein the first elongate member has one or more of a barb or one or more of a projection extending outwardly, and wherein said second elongate member has one or more of a barb or one or more of a projection extending outwardly.

9. A fixing according to claim 1, wherein the coupling arrangement comprises a loop, extending from the proximal end of the first elongate member to the proximal end of the second elongate member.

10. A fixing according to claim 1, wherein the first elongate member and the second elongate member and the coupling arrangement are formed from a single strip of material.

11. A fixing according to claim 1, wherein the fixing is a cable clip.

12. A fixing according to claim 1, wherein the fixing comprises or is substantially formed from a resilient material.

13. A fixing according to claim 1, wherein the coupling member is configured to retain at least one coupled member when the fixing is in a use state.

14. A fixing according to claim 1, wherein a portion of the first resiliently deformable inner formation is positioned to engage with a portion of the second resiliently deformable inner formation.

15. A method of fixing an article to a surface, comprising the steps of;

providing a cavity in a surface;

providing a fixing having at least two elongate members extending from a coupling arrangement; the elongate members being resiliently biased towards a position in which they are spaced apart from one another along at least a part of their length; and the elongate members each comprising a resiliently deformable inner formation in the form of an inwardly extending branch or arm, the inner formations extending toward an adjacent elongate member, the fixing having a resting state and a use state;

coupling an article to the fixing by introducing the article between the elongate members in a direction towards the coupling arrangement; thereby causing the article to ride up ramped surfaces of the inner formations oriented towards the distal ends of the elongate members;

bringing the elongate members closer together and inserting the elongate members into the cavity;

resiliently deforming when in the use state an inner formation which is spaced apart from a proximal end and a distal end of the elongate member, and thereby applying an outward force to the elongate members; and/or causing an outer conformable region to conform to inner surfaces of the cavity under the action of outward forces applied to or by the elongate members.

16. A method according to claim 15, further comprising the step of:

coupling the article to the coupling arrangement before insertion of the elongate members into the cavity.

17. A method according to claim 15, wherein the article is a cable.

18. A method of making a fixing for securing an article to a surface, comprising the steps of:

providing, a strip of resilient material;

forming a coupling arrangement from a central portion of the strip;

forming elongate members from end portions of the strip, the elongate members extending from the coupling arrangement and resiliently biased to be spaced apart from one another along at least a portion of their lengths; and forming a resiliently deformable inner formation from at least a part of a length of each elongate member; each inner formation optionally being spaced apart from a proximal end and a distal end of the elongate member, the fixing having a resting state and a use state; the inner formations extending toward an adjacent elongate member and positioned to engage therewith and resiliently deform, applying an outward force to the elongate members when the elongate members are brought together in the use state.

19. The method of claim 18, further comprising the steps of:

cutting out at least a part of an outline of an inner formation from each elongate member; and bending each respective inner formation inwardly so as to form an inwardly extending branch or arm.

20. The method of claim 19, wherein the outline of a side of the inner formation extends along the elongate member from the outline of an end of the inner formation, towards the distal end of the elongate member.

21. The method of claim 18, comprising bending the inner formations to form a ramp facing the distal ends of the elongate formations, or so that the ends of opposed inner formations are generally aligned.

* * * * *